United States Patent
Lim

(10) Patent No.: US 7,193,977 B2
(45) Date of Patent: Mar. 20, 2007

(54) HAND-OFF NOTIFYING AND CONTROLLING METHOD OF MOBILE NODE

(75) Inventor: Byung Keun Lim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 815 days.

(21) Appl. No.: 10/026,520

(22) Filed: Dec. 27, 2001

(65) Prior Publication Data

US 2002/0085518 A1   Jul. 4, 2002

(30) Foreign Application Priority Data

Dec. 28, 2000   (KR)  ................................ 2000-83536

(51) Int. Cl.
*H04Q 7/00*   (2006.01)
(52) U.S. Cl. ...................... 370/313; 370/331; 370/455
(58) Field of Classification Search ................ 370/331, 370/455, 313
See application file for complete search history.

(56) References Cited

U.S. PATENT DOCUMENTS 5,915,220 A * 6/1999 Chelliah .................. 455/435.2
6,549,522 B1 * 4/2003 Flynn ......................... 370/313
6,891,819 B1 * 5/2005 Inoue et al. ................ 370/338
6,988,146 B1 * 1/2006 Magret et al. .............. 709/238
2002/0089958 A1 * 7/2002 Feder et al. ................ 370/338

FOREIGN PATENT DOCUMENTS

JP   08237727   9/1996

OTHER PUBLICATIONS

Pete McCann, draft-ietf-mobileip-sessionid-00.txt, Mar. 2000, Internet Draft, 4-7.*

* cited by examiner

*Primary Examiner*—John Pezzlo
*Assistant Examiner*—Inder Pal Mehra
(74) *Attorney, Agent, or Firm*—Ked & Associates, LLP

(57) ABSTRACT

A hand-off notifying and controlling system of a mobile node is disclosed including a mobile node (MN) that transmits a registration request message. An old foreign agent (FA) provides a mobile IP service to the MN, before the hand-off takes place. A new FA provides a mobile IP service to the MN, after the hand-off takes place. A home agent (HA) generates and transmits a registration release message to the old FA, upon receipt of the registration request message from the MN via the new FA. When the MN is handed off, since the HA deletes the previous registration of the MN, registered in the old FA, the waste of memory resources and registration lock dead can be simply and effectively reduce or solved.

9 Claims, 5 Drawing Sheets

FIG. 2
BACKGROUND ART

Registration Request:

| 0 | 1 | 2 | 3 |
|---|---|---|---|
| 0 1 2 3 4 5 6 7 8 9 0 1 2 3 4 5 6 7 8 9 0 1 2 3 4 5 6 7 8 9 0 1 | | | |
| TYPE | S B D M G V RSV | LIFE TIME | |
| HOME ADDRESS | | | |
| HOME AGENT | | | |
| CARE-OF ADDRESS | | | |
| IDENTIFICATION | | | |

EXTENSIONS...

Registration Reply:

| 0 | 1 | 2 | 3 |
|---|---|---|---|
| 0 1 2 3 4 5 6 7 8 9 0 1 2 3 4 5 6 7 8 9 0 1 2 3 4 5 6 7 8 9 0 1 | | | |
| TYPE | CODE | LIFE TIME | |
| HOME ADDRESS | | | |
| HOME AGENT | | | |
| IDENTIFICATION | | | |

EXTENSIONS...

HAND-OFF NOTIFYING AND CONTROLLING METHOD OF MOBILE NODE

BACKGROUND OF THE INVENTION

1. Field of the Invention

The present invention relates to a mobile IP service and, more particularly, to a mobile IP service method of a mobile node after hand-off.

2. Background of the Background Art

Recently, as use of the mobile communication and wireless local area network (LAN) spread widely, the Internet service centered upon fixed terminals, depending on a wide area network (WAN) or a LAN, has dwindled while internet access using a mobile terminal has increased. In addition, research on mobile terminal internet access is being actively conducted. Accordingly, methods allowing an ATM network or a mobile communication network to accommodate an Internet protocol (IP) have been proposed by an Internet engineering task force (IETF) and an ATM forum, and a standardization is being made.

Currently, an IP version 4, mostly used in the Internet environment, is based on the assumption that in order for a node to receive a datagram transmitted to itself, the node is to be located within a network having an IP address of the node. If the node's location is changed, the datagram is not to be transmitted.

To support mobility of the node in the Internet, a more extensive technique is required, for which an IETF is currently promoting an RFC2002 as a standardization plan. The recommended standard (RFC2002) proposes a technical method allowing an existing IP address for a mobile node (MN) to be used without change, even though the MN connected to a TCP/IP network is moved to a different area.

FIG. 1 is a drawing illustrating a concept of a mobile IP service on the basis of the recommended standard (RFC2002). As an IP host having mobility, the mobile node transmits and receives data using a home IP address. When the MN 11 visits visiting networks 12 and 12', the foreign agents (FA) 13 and 13' de-capsulate an IP packet bound for the MN 11 and transmit the IP packet, while having a link connection with the MN 11. A home agent (HA) 15 is positioned at a pertinent home network 14 of the MN 11. The HA 15 manages a binding table of the MN 11, encapsulation of the IP packet bound for the MN 11, and transmits the IP packet.

FIG. 4 is a drawing illustrating a background art registration procedure of the hand-off MN. Processes performed to continuously support the mobile IP service to the hand-off MN 11 can be divided into three steps, which will now be described.

First, a step for finding an agent is performed (step S1). The mobility agent, such as the HA 15 or the FAs 13 and 13', broadcast an agent advertisement message to its own network areas 12 and 12' and, upon receiving the agent advertisement, the MN 11 determines the identity of the network area in which it is located. That is, if a new advertisement message, different to a previous advertisement message, is transmitted at an arbitrary time point to the MN 11, it signifies that the MN 11 was moved away from the area (network 1) of the previous FA 13 and has been moved into an area (network 2) of a different FA 13'. The agent advertisement message is a kind of area indication message that the agent 13, 13' and 15 transmits to its own network area, and the MN 11 recognizes the area where it is located through the agent advertisement.

Second, a registering step is performed. According to the agent finding step, if the MN 11 has been moved into a different network 12' area, the MN 11 and the HA 15 exchange a registration request message and a registration reply message, through which the MN 11 is registered in the MN 11. The registration messages are transmitted through a user datagram protocol (JDP) port and includes a care-of-address (COA) life time of the MN 11. The COA signifies an agent address of a network where the MN 11 is located.

Third, a routing and tunneling step is performed. As the MN 11 is successfully registered in the HA 15, a datagram transmitted from an external source to the MN 11 is tunneled to the COA, of the MN 11, by the HA 15. If an address of the FA is designated in the COA, the FA performs a de-capsulating. If the address of the FA is used as a co-located COA, the datagram to the MN 11 is de-capsulated, also.

The tunnel (or the IP tunnel) is a communication path used by the encapsulated datagram. HA 15 is a starting point of the tunnel and performs encapsulating, and the node for de-capsulating is the end point of the tunnel. The de-capsulating node is an object for transmitting the de-capsulated datagram to a destination, as well as de-capsulating the datagram.

If an address of the FA is designated in the COA, the FAs 13 and 13' operate as a de-capsulating node, but if the address of the FA is used as a Co-Located COA, the MN 11 operates as a de-capsulating node.

The process of the registering step is described below. First, MN 11 transmits a registration request message to the agent 13' of the network 12' in which the MN 11 is located. Second, the agent 13', that is, the FA 13', performs a predetermined registration procedure and transmits the registration request message to the HA 15. Third, the HA 15 transmits a registration allowance reply message or a registration refusal reply message to the FA 13', in response to the registration request. And fourth, the FA 13' transmits the received registration reply message to the MN 11.

The registering step will now be described in greater detail with reference to FIGS. 1 and 4. The MN 11 is moved (handed-off) from a service area (network 1) of a previous FA (referred to as 'old FA', hereinafter) to a service area (network 2) of a new FA 13' (step S0). Then, the MN 11 transmits a registration request message (type='1') to the agent 13' of the currently located network 12' (step S2). Upon receiving the registration request message, the FA 13' registers the MN 11 in a visitor table and transmits the registration request message to the HA 15 (steps S3-S5).

If the FA 13' does not allow the registration of the MN 11, the FA 13' transmits a registration reply message, having a predetermined registration disallowance code (64~73 or 80~82 or 88) in a code field, to the MN 11, rather than transmitting the MN's 11 registration request message to the HA 15 (steps S3 and S6). If the registration request of the MN 11 is allowed by the FA 13' but is not allowed by (steps S3-S5 and S7-S9) the HA 15, the FA 13' deletes the registration of the MN 11 stored in the visitor table.

When the HA 15 receives the registration request message of the MN 11, the HA 15 updates the binding table, with reference to an address value stored in the COA field of the registration request message (step S10). In this respect, as a matter of course, the HA 15 performs such operations only when there is no error in the registration request. After the binding table is updated, HA 15 communicates a registrated allowance message to the MN 11, via FA 13' (steps S12 and S13).

If the HA 15 disallows the registration of the MN 11, the HA 15 transmits the registration reply message, having the predetermined registration disallowance codes (128~136) in the code field, by way of the FA 13' (step S11). If the MN 11 is successfully registered in the FA 13' and the HA 15, an IP tunnel is established between the FA 13' and the HA 15. And, the HA 15 transmits the IP datagram, received from an Internet host, to the MN 11 through the established IP tunnel. At this time, the ending point of the IP tunnel is the FA 13' and the address of the FA 13' is called the care-of-address (COA).

Before transmitting the IP datagram to the IP tunnel, the HA 15 encapsulates the IP datagram to generate an IP packet. And, the FA 13' de-capsulates the IP packet, received through the IP tunnel, and transmits it to the MN 11.

The registration of the MN 11, stored in the visitor table of the FA 13', is effective only for the life time set in the registration request message. If re-registration is not made until the life time is terminated, the mobile binding table of the HA 15 and the registration of the MN 11, stored in the visitor table of the FA 13', are deleted, so that the MN 11 may not be provided with the mobile IP service any longer.

Since the IP packet from the Internet host is routed to the MN 11, through the above process, the MN 11 is provided with the mobile IP service even after its position is changed to a different service area. In addition, the MN 11 can continuously use its own home IP address, which has already been set, as the mobile IP address, regardless of the service area in which it is currently located.

FIG. 2 is a drawing illustrating an example of a registration request message and a registration reply message. Each field and set-up value of the registration request message and the registration reply message, illustrated in FIG. 2, will now be described.

If the set-up value of a field 'type' of a message is '1', it is a registration request message, while if the set-up value of the field 'type' is '3', it is a registration reply message. The 'S' field of the registration request message indicates a simultaneous binding. If the 'S' bit is set to ('1'), HA 15 maintains a previous mobility binding of the MN 11, as it is. Field 'B' is a broadcast datagram. If indicator bit 'B' has been set, HA 15 transmits the broadcast datagram received by the home network to the MN 11.

Field 'D' is de-capsulation indicator. If the bit 'D' has been set, it signifies that the MN 11 de-capsulates the datagram. That is, the co-located FA 13' is used as a mobile IP address of the MN 11.

When using the COA, the MN 11 registered for the FA 13' receives data by relying on the address of the FA 13'. The co-located FA 13' is used when the MN 11 has a local address connected to a network interface.

Field 'M' is a minimum encapsulation indicator. If bit 'M' is set, HA 15 encapsulates data transmitted to MN 11, minimally. Field 'G' is a 'GRE' encapsulation indicator. If bit 'G' is set, HA 15 GRE-encapsulates a datagram, to be transmitted to MN 11, and transmits it. If bit 'V' is set, the mobility agent 13,13' and 15 transmits data using a VanJacobson header compression method on a link connected to the MN 11. The 'rsv' field is reserved and its bits are set to '0'. In the life time field, a predetermined time is set and registration of the MN 11 is effective for the predetermined time.

The home address is an IP address of the MN 11. The home agent is an IP address of the HA 15. The COA is an IP address of the ending point of the tunnel. The identification field is 64-bit number constructed by the MN 11 to associate the registration request and the registration reply.

The code field of the registration reply message indicates a result of the registration request. That is, the HA 15 or the new FA 13' set the result (registration permission or registration disallowance) of the registration request of MN 11. A code value of '0' or '1' signifies a registration permission and a code value of '64~73', '80~82' or '88' signifies a registration disallowance, by the FA. If the code value is 128~136', it signifies a registration disallowance by the HA 15.

The meaning of the home address field and home agent field values are the same as for registration request message. A value for the identification field is a 64-bit number, set on the basis of the identification field of the MN's 11 registration request message and is used to match the registration request with a particular registration reply. Additionally, it is used to prevent a reply denial to the registration message. Thus, upon receiving the registration request message of the MN 11, the HA 15 creates or corrects a binding table for the MN 11, with reference to a set value of each field and bit contained in the registration request message.

As noted, even though the location of the MN 11 is changed, the FA 13 is not informed of the hand-off of the MN 11, by the HA 15 or the MN. Thus, the FA 13 retains the visitor table until the set life time is terminated, causing waste of the memory.

Referring now to the mobile communication network shown in FIG. 3, when a mobile station (MS) 105 is moved into an area of the PSDN 102', while still receiving a service in the service area of a packet data serving node (PSDN) 102, the PSDN 102 still occupies the visitor table of the MS 105. A radio link resource of MS 105 and BS 103 manages the information of the MS 105, which does not exist in its own service area since it has been handed off. This results in the waste of PSDN 102 and BS 103 resources.

The BSs 103 and 103' are objects incorporating a base station transceiver, a base station controller, and a packet controller function. The three objects are all independent mobile communication equipment. The equipment is simply represented by the BSs 103 and 103' for the sake of brevity.

As another example, suppose that the MS 105, which has been handed off to a service area of PSDN 102', is handed off back to the service area of PSDN 102 before its own life time registered in PSDN 102 is terminated. MS 105 has been registered in the binding table of PSDN 102 and the set time of the life timer is still effective. Therefore, even though MS 105 transmits a registration request message, PSDN 102 and BS 103 refuse to receive the registration request. Thus, when the set time of the life timer is terminated, a dead lock registration takes place. Even though MS 105 is actually located in the service area of BS 103, BS 103 does not recognize it MS 105 since BS 103' recognizes MS 105 as being located in the service area of BS 103'.

In order to solve the dead lock registration problem and the waste of memory resources, various methods and algorithms have been proposed. However, each of these disadvantageously requires additional resources to solve the problems.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a hand-off notifying and controlling method of a mobile node that is capable of solving a dead lock registration of a handed-off mobile node.

Another object of the present invention is to provide a hand-off notifying and controlling method of a mobile node that is capable of effectively managing memory resources of a previous FA, by notifying it of a mobile node hand-off To achieve at least the above objects in whole or in part, there is provided a hand-off notifying and controlling system of a mobile node including a mobile node (MN) transmitting a registration request message; an old foreign agent (FA) providing a mobile IP service to the MN before the hand-off takes place; a new FA providing a mobile IP service to the MN, after the hand-off takes place; and a home agent (HA) generating and transmitting a registration release message to the old FA, upon receipt of the registration request message from the MN, via the new FA, when hand-off takes place.

To further achieve the above objects in a whole or in part, there is provided a preable claim 1/7 according to the present invention that includes claim 1/7 in sentence form.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To further achieve the objects in whole or in part, there is provided a hand-off notifying and controlling system, comprising a mobile node (MN) that transmits a registration request message, a first foreign agent (FA) that provides a mobile internet protocol (IP) service to the MN, before a hand-off of the MN takes place, a second FA that provides the mobile IP service to the MN after the hand-off takes place; and a home agent (HA) that generates and transmits a registration release message to the first FA, upon receipt of the registration request message from the MN sent via the second FA, when the hand-off takes place.

To further achieve the objects in whole or in part, there is provided a hand-off notifying and controlling method, comprising and transmitting a registration request message from a mobile node (MN) to a home agent (HA) when a hand-off takes place from a first foreign agent (FA) to a second FA, transmitting a registration release message from the HA to the first FA, and deleting registration information of the MN at the first FA in accordance with the registration release message.

BRIEF DESCRIPTION OF THE DRAWINGS

The invention will be described in detail with reference to the following drawings in which like reference numerals refer to like elements wherein:

FIG. 2 illustrates a registration request message and a registration reply message;

DETAILED DESCRIPTION OF PREFERRED EMBODIMENTS

Figure 5:
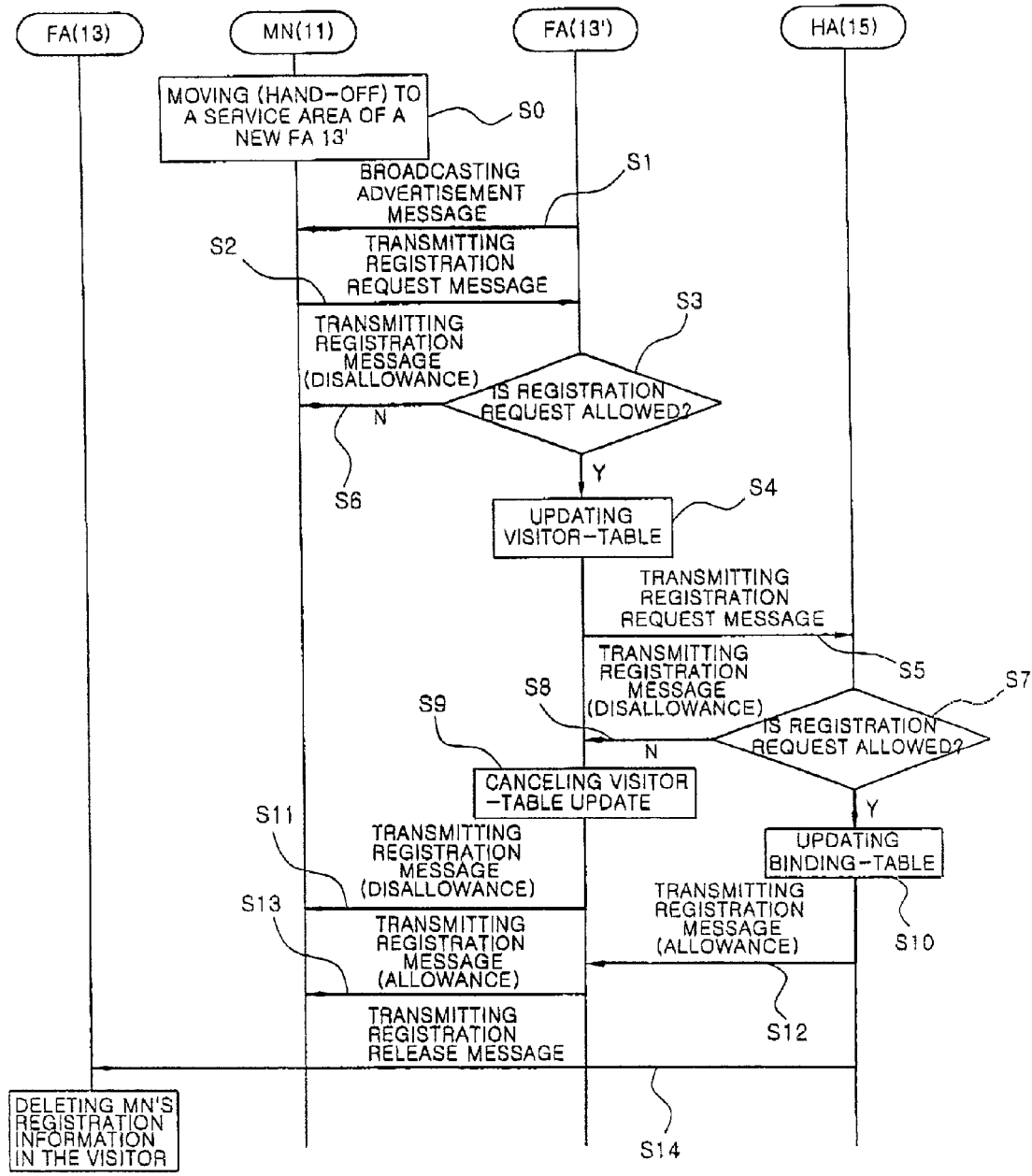
FIG. 5 is a diagram that illustrates a flow chart of a registering procedure of a handed-off MN, in accordance with a preferred embodiment of the present invention.

FIG. 5 is a diagram that shows a flow chart of a preferred embodiment of a registering procedure in a mobile communication system, in accordance with the present invention. Preferred embodiments of hand-off notifying and controlling method of a mobile node in accordance with the present invention preferably includes transmitting a registration request message to an HA, when a mobile node is handed off; transmitting a registration release request message to a previous FA (e.g., an old FA), from the HA receiving the message; and deleting the registration of an MN stored in a visitor table of the old FA according to the registration release request of the HA.

The hand-off notifying and controlling method of a mobile node according to the preferred embodiment of a registering procedure as shown in FIG. 5, will now be described. As shown in FIG. 5, when the MN 11 moves away from a service area (network 1) of the old FA 13 and moves into a service area (network 2) of the new FA 13', the MN11 receives an agent advertisement message broadcast from the new FA 13' (steps SO and S1).

Upon receiving the new agent advertisement message, the MN 11 transmits a registration request message to the HA 15 in the same manner as that of the background art (step S2). Then, the HA 15 updates a binding table, while transmitting a registration reply message, allowing the registration of the MN 11 (steps S3-S13). The above processes are preferably the same as those of the background art.

Thereafter, the HA 15 preferably informs the old FA 13 that the MN 11 has been handed off. As shown in FIG. 5, the HA 15 transmits a registration release message to the old FA 13, to inform it that the MN 11 has been handed-off (step S14). A UDP field of the registration release message can use the registration request message (e.g., type='1') and sets a life time field as '0'. The reason for setting the life time field to '0' is because the registration of the MN 11, set in the visitor table of the old FA 13, is effective only for the life time. By setting the life time field to '0', the life time is terminated.

Upon receiving the registration release message, the old FA 13 deletes the registration of the pertinent MN 11 from the visitor table. Thereby, the waste of resources within the old FA 13 caused by the allocation of memory to store the registration is reduced or prevented.

The HA 15 preferably sets a home address of the MN 11 in the home address field of the registration release message, sets an address of the HA 15 in the home agent field, sets an address of the old FA 13 in the COA field, and sets the same identification field value set in the registration request message. When the HA 15 transmits the registration release message, it determines whether the message is to be transmitted with reference to the 'D' and 'S' bits of the registration request message.

If the bit 'D' has been set to '1', the HA 15 preferably does not transmit a registration release message to the old FA 13. Similarly, if the 'S' bit has been set to '1', the HA 15 does not transmit the registration release message. If the 'S' bit has been set, the MN 11 receives an IP datagram according to a multiple simultaneous mobility binding. That is, the MN 11 maintains the binding with the old FA 13' as well as with the new FA 13, so as to receive the IP datagram through multiple paths.

Figure 1:
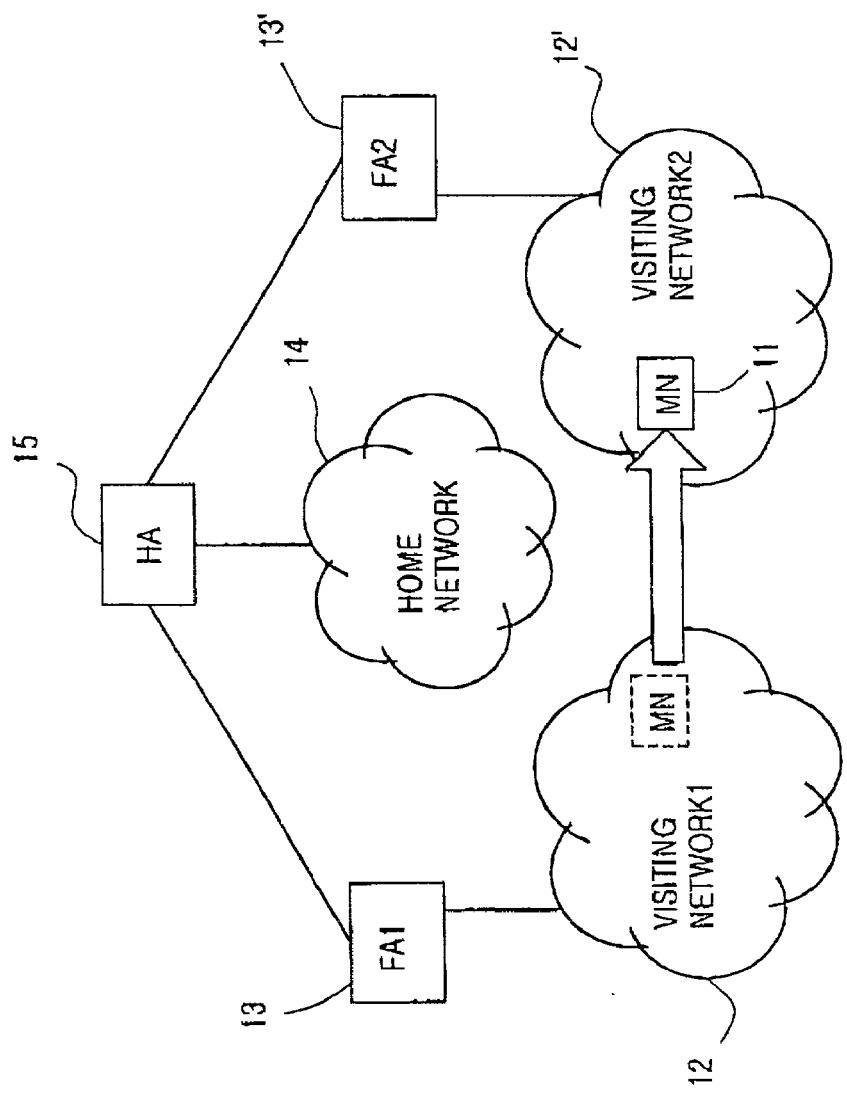
FIG. 1 illustrates a background art mobile IP service network model, according to a recommended standard (RFC2002) of a mobile IP, of the IETF.
Figure 3:
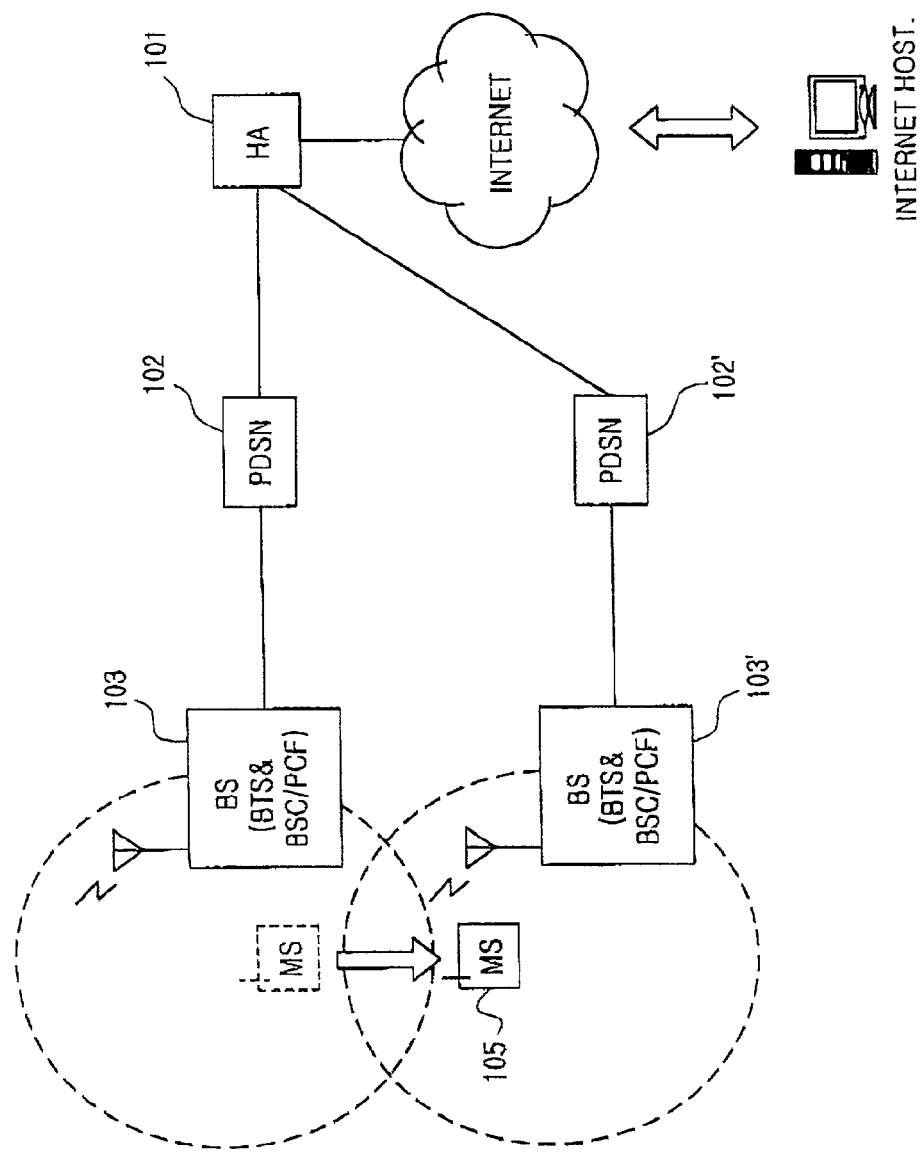
FIG. 3 illustrates a background art mobile communication network, for mobile IP service.
Figure 4:
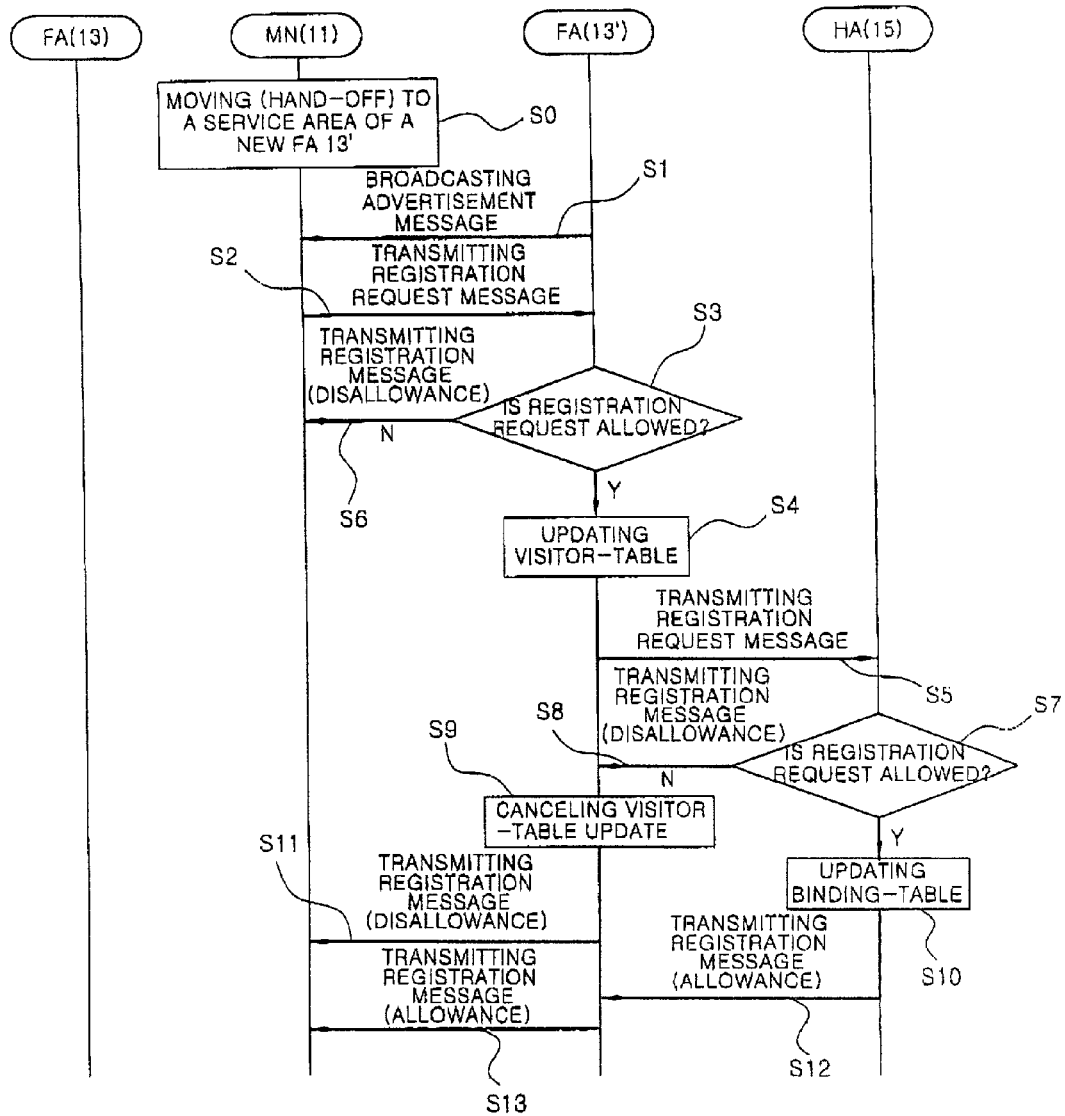
FIG. 4 illustrates a flow chart of a background art registering procedure of a handed-off MN.

An exemplary adoption of the preferred embodiment hand-off notifying and controlling method of a mobile node shown in FIG. 5 to a mobile communication network (e.g., IMT-2000), illustrated in FIG. 3, will now be described. When MS 105 is handed off from the service area of PDSN 102 to the service area of PDSN 102', MS 105 transmits a registration request message to PDSN 102' (steps S0-S2). PDSN 102' transmits the received registration request message to HA 101 (steps S3-S5). PDSNs 102 and 102' can perform the same function as foreign agents 13 and 13'.

Upon receiving the registration request message, HA 101 updates the registration of MS 105, preferably stored in the binding table or the like, and transmits a message having the life time field set to '0', that is, a registration release message or the like, to old PDSN 102 (steps S6-S14). Upon receiving the registration release message, old PDSN 102 deletes the registration of MS 105 from the visitor table and releases the link. Other operations and performing conditions can preferably be the same as those of the background art.

As the link is released, BS 103, subordinately connected to PDSN 102, deletes the information on MS 105 to reduce a system load, so that the link resources can be effectively managed.

In addition, when MS 105 is re-handed off to the service area of PDSN 102, it can be newly registered in the visitor table, so that the dead lock registration problem can be also solved.

As described above, preferred embodiments of a hand-off notifying and controlling method of a mobile node and a mobile communication system according to the present invention have various advantages. When MN is handed off, since the HA deletes a registration of the MN, which has been registered in a previous or old FA, the waste of memory resources and registration lock dead, problems of the background art, can be simply and effectively reduced or solved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A hand-off notifying and controlling system, comprising:
   a mobile node (MN) that transmits a registration request message;
   a first foreign agent (FA) that provides a mobile internet protocol (IP) service to the MN, before a hand-off of the MN takes place;
   a second FA that provides the mobile IP service to the MN after the hand-off takes place; and
   a home agent (HA) that generates and transmits a registration release message to the first FA, upon receipt of the registration request message from the MN sent via the second FA directly to the HA, when the hand-off takes place, the HA setting the life time field of the registration release message to the value of 0 causing the first FA to delete prior registration information of the MN, stored in at least a visitor table, after receipt of the registration release message,
   wherein the registration release message has a data structure and type field value identical to the registration request message.

2. The system of claim 1, wherein the registration release message comprises:
   a type field set to identify a type of message;
   a life time field that sets an effective registration time of the MN;
   a home address field that sets an IP address of the MN;
   a home agent field that sets an IP address of the HA;
   a care-of-address field that sets an IP address of an ending point of a tunnel; and
   an identification field set to associate the registration request message and a registration reply message.

3. The system of claim 1, wherein the HA does not transmit a registration release message, if an IP address of the MN is a multiple care-of address.

4. A hand-off notifying and controlling method, comprising:
   transmitting a registration request message from a mobile node (MN) to a home agent (HA) via a second FA directly to the HA when a hand-off takes place from a first foreign agent (FA) to the second FA;
   transmitting a registration release message from the HA to the first FA; and
   deleting registration information of the MN at the first FA in accordance with the registration release message,
   wherein the registration release message sets the life time field value to 0 to delete the registration information of the MN stored in at least a visitor table of the first FA that provided a mobile IP service to the MN before the hand-off,
   wherein the registration release message has the same data structure and type field value as the registration request message.

5. The method of claim 4, wherein the registration release message comprises:
   a type field set to identify a type of message;
   a life time field that sets an effective registration time of the MN;
   a home address field that sets an internet protocol (IP) address of the MN;
   a home agent field that sets an IP address of the HA;
   a care-of-address field that sets an IP address of an ending point of a tunnel; and
   an identification field set to associate the registration request message and a registration reply message.

6. The method of claim 4, wherein the HA does not transmit a registration release message, if an internet protocol (IP) address of the MN is a multiple care-of address.

7. A hand-off notifying and controlling method in a mobile communication network, comprising:
   transmitting a registration request message from a mobile node (MN) to a new foreign agent (FA), when a hand-off of the MN to the new FA takes place;
   transmitting the registration request message received by the new FA directly to a home agent (HA) of the MN;
   transmitting a registration release message, having a data structure and type field value the same as the registration request message, from the HA that has received the registration release message from the new FA, to an old FA; and
   deleting registration information of the MN, stored in at least a visitor table of the old FA, in accordance with the registration release message,
   wherein the HA sets a life time field of the registration release message to a value of 0 to cause the deletion of the registration information of the MN in the old FA that provided mobile IP service to the MN before the hand-off.

8. The method of claim 7, wherein the registration release request message comprises:

a type field set to identify a type of message;
a life time field that sets an effective registration time of the MN;
a home address field that sets an internet protocol (IP) address of the MN;
a home agent field that sets an IP address of the HA;
a care-of-address field that sets an IP address of an ending point of a tunnel; and
an identification field set to associate the registration request message and the registration release message.

9. The method of claim 7, wherein the HA does not transmit the registration release message, if an internet protocol (IP) address of the MN is a multiple care-of-address.

* * * * *